US008444010B2

(12) United States Patent
Berger

(10) Patent No.: US 8,444,010 B2
(45) Date of Patent: May 21, 2013

(54) FOOD PRODUCT DISPENSING APPARATUS

(75) Inventor: Tom S. Berger, Story City, IA (US)

(73) Assignee: Benchmark USA, Inc., Ames, IA (US)

( * ) Notice: Subject to any disclaimer, the term of this patent is extended or adjusted under 35 U.S.C. 154(b) by 1224 days.

(21) Appl. No.: 11/752,444

(22) Filed: May 23, 2007

(65) Prior Publication Data

US 2008/0035664 A1 Feb. 14, 2008

Related U.S. Application Data

(60) Provisional application No. 60/821,724, filed on Aug. 8, 2006.

(51) Int. Cl.
*G07F 9/10* (2006.01)
*B65G 60/00* (2006.01)

(52) U.S. Cl.
USPC .......... 221/150 A; 221/199; 221/277; 99/375; 99/400; 99/425; 99/444; 99/324; 219/520; 219/524

(58) Field of Classification Search
USPC .. 221/1–312 C, 97, 150 A, 199, 277; 99/375, 99/400, 425, 444, 324
See application file for complete search history.

(56) References Cited

U.S. PATENT DOCUMENTS 5,848,567 A * 12/1998 Chiang ........................... 99/375
5,878,657 A * 3/1999 Gschwind ........................ 99/446
6,800,314 B2 * 10/2004 Evans et al. .................... 426/233

OTHER PUBLICATIONS

Star Manufacturing Inernational, Inc., Classic Steamro, Jr. Hot Doog Steamer, Model 35SSC, St. Louis, MO., USA.
Funfood Equjipment & Supplies, Steamin, Demon Hot Dog Steamer, Instruction Manual Model #8007 and #8013, Cincinnati, OH 45241-4807 USA—Jun. 1996.
Star Manufacturing International, Inc., Hot Dog Steamers, Model 35SSA & 70SSA, St. Louis, MO, USA.
Gold Medal Products Co., Hot Dogs, Hot Dog Roller Grills, Cincinnati, OH, USA—Jul. 11, 2006.
Five Star Marketng Inc., Lil' Diggity Roller Grill, Mentor, OH—USA, Jul. 11, 2006.

* cited by examiner

*Primary Examiner* — Michael K Collins
(74) *Attorney, Agent, or Firm* — Zarley Law Firm, P.L.C.

(57) ABSTRACT

A food dispensing device having a frame with first and second sidewalls in spaced parallel relation that house a heating board and a slant board. The slant board is positioned below the heating board and both slope downwardly. Specifically, the heating board has a plurality of slots therein such that juice from a food product flows through the slots and onto the slant board. Adjacent and below the heating board and slant board is a flange that is positioned such that when a food product is placed on the heating board the food product rolls toward the flange and simultaneously juice flows from off the slant board into a juice tray disposed below the flange.

1 Claim, 3 Drawing Sheets

FOOD PRODUCT DISPENSING APPARATUS

CROSS REFERENCE TO RELATED APPLICATION

This application claims the benefit of U.S. Provisional Application No. 60/821,724 filed Aug. 8, 2006.

BACKGROUND OF THE INVENTION

This invention relates to a food product dispensing apparatus and more particularly to an apparatus that selectively transfers food from a cooking/heating zone to a consumption zone.

Devices for cooking and heating food products such as hotdogs, sausages and the like in a convenience store setting are well known in the art. Typically, these devices have a cooking area where the food product is cooked and heated and a storage area where buns and wrappers are maintained. To remove the food product, tongs are provided to lift the food product from the heating surface and place the product in a bun or wrapper. The tongs can be awkward to use and occasionally food product breaks or is dropped leading to waste. Also, on occasion one will forego the tongs and use their fingers. Not only is this unsanitary, but it potentially is unsafe as one might burn their fingers on the heating surface. Accordingly, there is a need in the art for a device that addresses these deficiencies.

Thus, a principal object of the present invention is to provide a sanitary manner of retrieving food products.

Yet another object of the present invention is to provide a food product dispensing device that improves safety and minimizes burns received by users.

These and other objects, features, or advantages of the present invention will become apparent from the specification and claims.

BRIEF SUMMARY OF THE INVENTION

A food dispensing device having a frame with first and second side walls that are in spaced parallel relation. A heating board is disposed between the side walls and angled downward from a first end to a second end. The heating board additionally has a plurality of slots disposed therein such that juice from a food product on the heating board flows through the slots. The food dispensing device additionally has a slant board that is also disposed between the side walls and positioned below the heating board and is angled downwardly from a first end to a second end for receiving the juices from the food product. A flange is placed adjacent to and positioned below both the second end of the heating board and the second end of the slant board and has a plurality of openings therein. Thus, a food product on the heating board can fall from the second end of the heating board onto the flange while juice flows off the slant board through the openings within the flange and into a juice tray positioned below the flange.

DESCRIPTION OF THE PREFERRED EMBODIMENT

Figure 1:
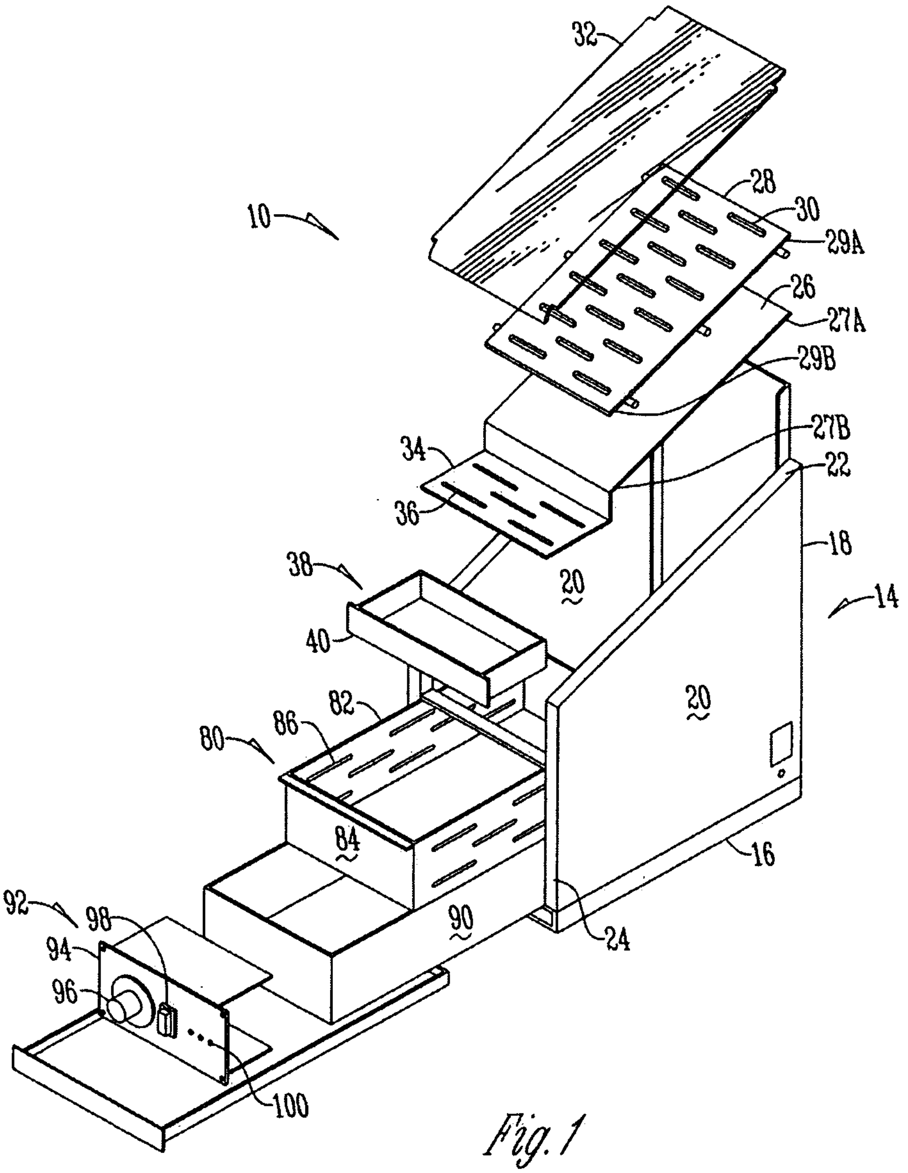
FIG. 1 is an exploded perspective view of a food dispensing device.
Figure 2:
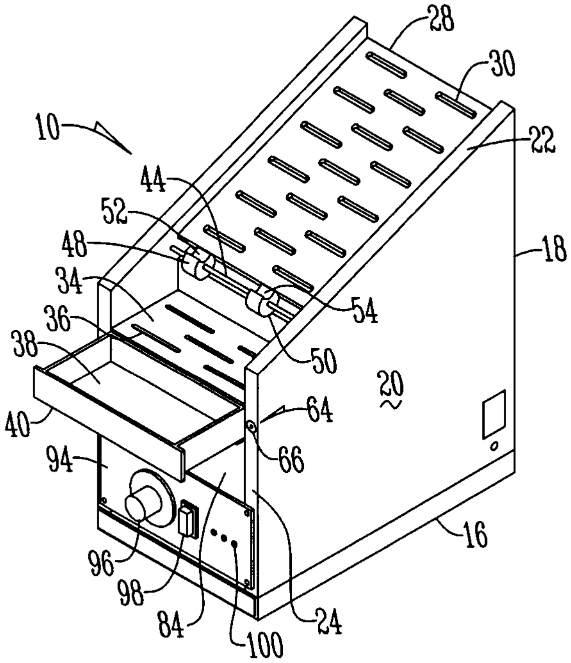
FIG. 2 is a front plan view of a food dispensing device.
Figure 3:
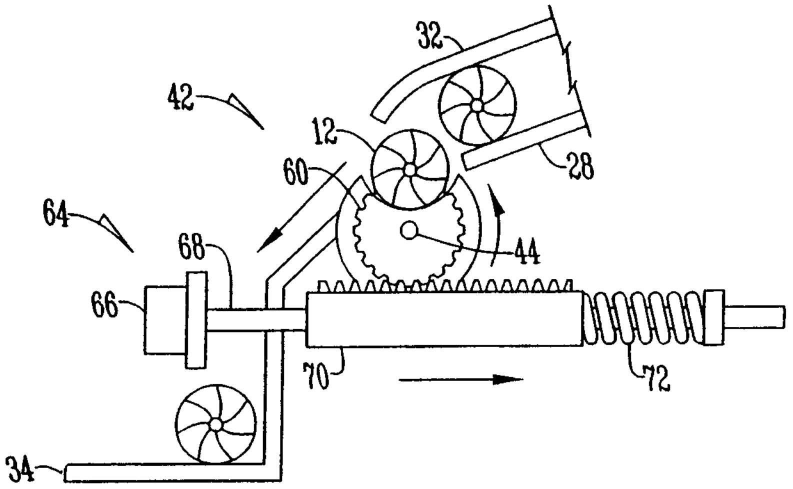
FIG. 3 is a side plan view of a dispensing mechanism and actuation assembly for a food dispensing device.

The dispensing device 10 is used with any food product 12 such as hotdogs, sausages, egg rolls, tostadas, and the like. The dispensing device 10 has a frame 14 having a bottom 16, a back wall 18, and side walls 20. The side walls 20 have a top edge 22 that slants downwardly from the back wall 18 to the front edge 24 of the side walls 20.

Mounted to the side walls 20, in spaced parallel alignment to the top edge 22, is a slant board 26 that extends from a first end **27*a* downwardly to a second end 27*b*. Also mounted to the side walls 20, above and in spaced parallel alignment to the slant board 26 is a heating board 28. The heating board is angled from a first end 29*a* downwardly to a second end 29*b*. The heating board 28 also has a plurality of slots 30 that allow juice to pass from the food product 12 through the slots 30 to the slant board 26. Also, pivotably mounted to the back wall 18 and formed to engage the top edge 22 of the side walls 20 is a guard member 32. The guard member 32 is of any material and preferably is made of a transparent material such as glass. The guard member 32 assists in holding steam to heat the food product 12 and protects the food product 12** in a similar fashion to a sneeze guard.

The slant board 26, heating board 28, and guard member 32 all extend from the back wall 18 and terminate prior to reaching the front edge 24. Below, adjacent and in spaced relation to the terminating end of the slant board 26 is a flange 34. The flange 34 extends between the side walls 20 and has flange slots 36 therein to allow juices to escape. Located below the flange 34 is a removable juice drip tray 38 that has a face 40 that in a closed position engages the front edges 24 of the side walls 20. The juice drip tray 38 extends beneath the flange 34 and the terminating end of the slant board 26 such that juices coming off the food product on the heating board 28 rolls down the slant board 26 into the juice drip tray 38 along with additional juice that falls through the flange slots 36 in flange 34. Consequently, the juice drip tray 38 may be easily removed to facilitate cleaning and emptying of the juice and tray.

Extending between the side walls 20 adjacent the terminating end of the heating board 28 and above the flange 34 is a food dispensing mechanism 42. In one embodiment the food dispensing device dispenses hotdogs. The dispensing mechanism 42 comprises a rotatable rod 44 that extends between the side walls 20. The rotatable rod 44 is disposed through a pair of rotatable holding members 48, 50. The rotatable holding members 48, 50 are cylinders having notches 52, 54 disposed therein for holding a food product such as a hotdog. The members 48, 50 are also designed such that when a food product from the heating board 28 rolls within the notches 52, 54, the food product weighs down the front of the members 48, 50 such that the back of the members 48, 50 rise to prevent an additional food product from rolling into the notches 52, 54.

The rotatable rod 44 is disposed through one of the side walls 20 and a gear 60. The gear 60 is placed in connection with an actuating mechanism 64. The actuating mechanism 64 comprises a push button 66 attached to end of an actuation rod 68 that extends to and is attached to a rack gear 70 that engages the gear 60 of the rotatable rod 44. Adjacent the rack gear 70 is a spring 72 such that when the push button 66 is compressed, the actuation mechanism 64 moves towards the dispensing device 10 rotating the gear 60 to drop a food product onto the flange 34 below.

In an embodiment wherein the food product is a hotdog a hotdog bun is placed on the flange 34 to catch a hotdog before hitting the flange. When the hotdog drops from the members 48, 50 the second edge of the members 48, 50 prevent a second hotdog from falling into the notches 52, 54. Then the spring 72 returns the actuating mechanism 64 to its original position allowing the next hotdog to roll into the notches 52, 54 of the members 48, 50 to prepare for the next customer.

Below the juice drip tray 38 is a holding tray 80 having side panels 82 and a front panel 84 wherein the side panels 84 have tray slots 86 therein to receive steam. In a preferred embodiment the holding tray contains hotdog buns. Located underneath the tray 80 is a fluid reservoir 90. The fluid reservoir 90 is electrically connected to a heating apparatus 92 that varies the temperature within the reservoir 90. In a preferred embodiment the reservoir 90 holds 8 quarts of water.

The heating apparatus 92 has a face plate 94 with a heat controlling knob 96 and an on/off button 98. In a preferred embodiment the heat controlling knob 96 is an adjustable thermostat and the heating apparatus is a 1000 watt heating element. Additionally, there is a plurality of LEDs 100 thereon to indicate when the hotdog machine 10 is operating. Thus, the heating apparatus 92 warms the fluid in the fluid reservoir 90 in order to provide steam for the hotdog machine 10 that not only heats the food products via the heating board 28 but additionally keeps additional food products stored within tray 80 warm.

In operation, in an embodiment when the food product is a hotdog and an individual requests a hotdog the hotdog vendor opens the holding tray 80 to retrieve a warm hotdog bun. Then the vendor places the hotdog bun onto the flange 34 of the machine 10. At this time the vendor compresses the push button 66 actuating the rotatable rod 44 to dispense a hotdog that falls into the bun on the flange 34. The vendor than grabs the bun off the flange 34 to provide to the consumer. Thus, a hotdog is able to be prepared without an individual touching the meat before providing it to a consumer. Additionally, tongs are not needed in order to retrieve the hotdog preventing the hotdogs from breaking before being placed into the bun. By using the push button actuation device 64 the hotdog bun is placed onto a flange 34 that is unheated such that an operator does not burn their fingers when retrieving the hotdog. Thus, at the very least all of the stated objectives have been met.

It will be appreciated by those skilled in the art that other various modifications could be made to the device without the parting from the spirit in scope of this invention. All such modifications and changes fall within the scope of the claims and are intended to be covered thereby.

What is claimed is:

1. A food dispensing device comprising:

a frame having first and second sidewalls in spaced parallel relation;

a heating board connected to the first and second sidewalls and angled downward from a first end to a second end and having at least one slot disposed therethrough;

a slant board connected and disposed between the sidewalls and angled downward from a first end to a second end;

said slant board positioned below the heating board such that when juice from a food product is disposed through a slot in the heating board the juice lands on the slant board;

a flange adjacent to and positioned below the second end of the heating board and having at least one opening therein;

wherein the slant board is positioned in relation to the flange such that the juice from the food product flows from the second end of the slant board into a juice tray positioned below the flange;

a dispensing mechanism having a rod rotatably connected between the sidewalls and disposed through at least one food holding member; and said dispensing mechanism positioned adjacent the second end of the heating board and above the flange.

* * * * *